United States Patent
Salinger et al.

(10) Patent No.: US 9,104,882 B2
(45) Date of Patent: Aug. 11, 2015

(54) RECONFIGURABLE ACCESS NETWORK ENCRYPTION ARCHITECTURE

(75) Inventors: Jorge Daniel Salinger, Littleton, CO (US); Kevin Taylor, Parker, CO (US); James William Fahrny, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1219 days.

(21) Appl. No.: 12/961,899

(22) Filed: Dec. 7, 2010

(65) Prior Publication Data

US 2014/0108782 A1 Apr. 17, 2014

(51) Int. Cl.
- H04L 29/06 (2006.01)
- G06F 21/60 (2013.01)
- G06F 21/10 (2013.01)
- H04N 21/226 (2011.01)
- H04N 21/266 (2011.01)
- H04N 21/63 (2011.01)

(52) U.S. Cl.
CPC .............. *G06F 21/602* (2013.01); *G06F 21/10* (2013.01); *H04L 63/0457* (2013.01); *H04N 21/226* (2013.01); *H04N 21/26606* (2013.01); *H04N 21/631* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 2003/0014627 A1* | 1/2003 | Krishna et al. | 713/153 |
| 2005/0025145 A1* | 2/2005 | Rakib et al. | 370/389 |
| 2006/0013240 A1* | 1/2006 | Ma et al. | 370/401 |
| 2006/0136724 A1* | 6/2006 | Takeshima et al. | 713/168 |
| 2007/0033282 A1* | 2/2007 | Mao et al. | 709/226 |
| 2010/0095348 A1* | 4/2010 | Foster et al. | 726/1 |

* cited by examiner

*Primary Examiner* — David Pearson
(74) *Attorney, Agent, or Firm* — Banner & Witcoff, Ltd.

(57) ABSTRACT

An access platform or other network elements can include multiple line cards configured to encrypt data. The platform and/or each of the line cards may receive encryption management data that conforms to a predefined encryption management data interface. The encryption management data received by a particular line card may be generated by a conditional access system device and converted to conform to the encryption management data interface by an encryption manager. Line cards may alternatively be configured for connection to separate encryption hardware components. Line cards may include a block of field programmable gate arrays or other type of programmable hardware that can be configured to execute an encryption module.

19 Claims, 9 Drawing Sheets

RECONFIGURABLE ACCESS NETWORK ENCRYPTION ARCHITECTURE

BACKGROUND

It is often desirable to encrypt data being communicated to multiple destinations dispersed throughout a large network. As one example, video and other types of content are often distributed to thousands of end user devices served by a particular network. The operator of that network may encrypt data for some or all of that content so as to prevent unauthorized access.

Conventional techniques for encrypting large amounts of data sent to a large number of destinations have included incorporation of encryption operations into a dedicated transmission element such as an edge device on the network. The operations of encryption software within the edge device might be controlled by a separate conditional access system (CAS) device such as a server or other computer that communicates with the edge device. In many cases, encryption utilizes programs and communications that are proprietary to the vendor(s) of the CAS device and edge device.

These and other conventional techniques can limit the ability of a network operator to modify a network architecture. For example, it can be difficult to relocate data transmission functions to a different network element but still use existing CAS devices to manage encryption.

SUMMARY

This Summary is provided to introduce a selection of concepts in a simplified form that are further described below in the Detailed Description. This Summary is not intended to identify key features or essential features of the invention.

In some embodiments, an access platform or other network element may include multiple line cards configured to encrypt data using different encryption modules. The platform and/or each of the line cards may receive encryption management data that conforms to a predefined encryption management data interface. The encryption management data received by a particular line card may be generated by a conditional access system (CAS) device and converted to conform to the encryption management data interface by an encryption manager. In some additional embodiments, each of multiple line cards may be configured for connection to a separate encryption hardware component, with each encryption hardware component communicating with an associated CAS device. In still other embodiments, each of multiple line cards may include a block of field programmable gate arrays (FPGAs) or other type of programmable hardware that can be configured to execute an encryption module.

DETAILED DESCRIPTION

In at least some embodiments, an access network platform (or "access platform") receives content data from one or more sources in a larger network. The access platform encrypts that received content data and forwards it to end devices within the access network. As used herein, "content" can include (but is not limited to) information in the form of television programming, movies, music or other audio media, text, still images, interactive applications, etc. The video, audio and/or other information associated with a particular content item can be encoded into "content data" for communication and subsequent decoding and/or other processing so as to render or otherwise output that information to an end user.

Figure 1:
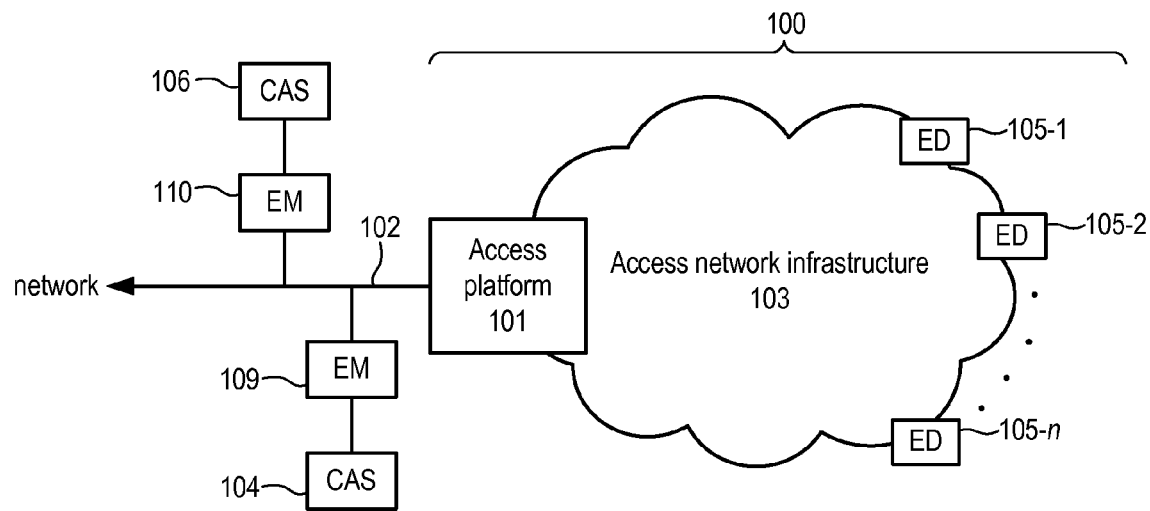
FIG. 1 is a block diagram showing elements in an access network according to some embodiments.

FIG. 1 is a block diagram showing elements in an access network 100 according to some embodiments. Access network 100 may be part of a larger network that includes multiple additional access networks and that spans a large geographic region. Access network 100 includes an access platform 101 that receives data from the larger network over one or more regional network links 102. Platform 101 can also transmit data to other elements in the larger network over regional network link(s) 102. Platform 101 sends data to (and receives data from) multiple end devices 105-1 through 105-$n$ (hereinafter, "end devices 105") in access network 100 via access network infrastructure 103. In the examples used herein, and unless otherwise specified, "n" or another italicized lower case letter appended to a reference number indicates the presence of an arbitrary number of similar elements. In some embodiments, access network 100 may include hundreds or thousands of individual end devices.

Platform 101 may receive content data over link(s) 102 from any of various devices or locations in the larger network. Platform 101 may then distribute that content data to one, some or all end devices 105. In particular, content data distributed from platform 101 may be distributed via either multicast or unicast techniques, or via other methods. Content data received by and distributed from platform 101 may comprise, e.g., internet protocol (IP) video. As part of content data distribution, platform 101 may route certain content data to certain portions of infrastructure 103, may perform protocol conversion operations, and may perform numerous other operations. For example, and as described in further detail below, components within platform 101 may encrypt content data in accordance with encryption management data and encryption control data. Encryption management data can be generated by conditional access system (CAS) devices 104 and 106, formatted (or otherwise modified) by encryption managers (EM) 109 and 110, and then provided to platform 101. Encryption control data may also be generated by CAS devices 104 and 106, but may pass to access platform 101 without first being formatted or otherwise processed by encryption managers 109 and 110. Encryption management data and encryption control data are discussed more fully below in connection with FIG. 2B and subsequent drawing figures. Examples of various types of encryption management data and encryption control data are also provided in connection with the discussion of FIG. 2B.

Access network 100 can employ any of various communication media and may utilize known communication protocols. In some embodiments, for example, access network infrastructure 103 may comprise components of a hybrid fiber coaxial (HFC) plant having fiber optic and coaxial portions, optical nodes, amplifiers and other elements known in the art. As another example, access network 100 may be a fiber to the home (FTTH) passive optical network (PON) and infrastructure 103 may include fiber optic lines, amplifiers and other known PON elements. As yet another example, access network 100 may be a digital subscriber line (DSL) network and infrastructure 103 may include conventional DSL network elements. As yet a further example, access network 100 may be a wireless (e.g., satellite) data network in which data communications occur through free space, and infrastructure 103 may include base stations and other wireless communication equipment. In some embodiments, access network 100 may have multiple portions that each uses different communication technologies (e.g., infrastructure 103 could include HFC, DSL, PON, wireless and/or other type portions).

End devices 105 receive encrypted content data from platform 101 and may decrypt that data, for example, in accordance with entitlement messages. As further explained below, such entitlement messages may be generated by CAS devices 104 and 106 and forwarded to end devices 105 by access platform 101. End devices 105 may also further process decrypted control data. That further processing can include decoding of video, audio and other content data for output to a user on a display screen, speaker or other output device. Examples of end devices include a set top terminal (STT), a computer, a television, a mobile telephone, a tablet computing device, a game console, etc. In some cases, an end device may include hardware (e.g., an optical transceiver, a wireless radio frequency (RF) transceiver, a modem (e.g., a cable or DSL modem), etc.) for transmitting and receiving data over the communication media of infrastructure 103. In other cases, an end device may be in data communication with a separate device that transmits and receives over infrastructure 103. Examples of such other devices, which are not shown in FIG. 1, can include a separate modem, a separate RF transceiver, an optical network terminal (ONT) or other optical terminal, etc.

Figure 2A:
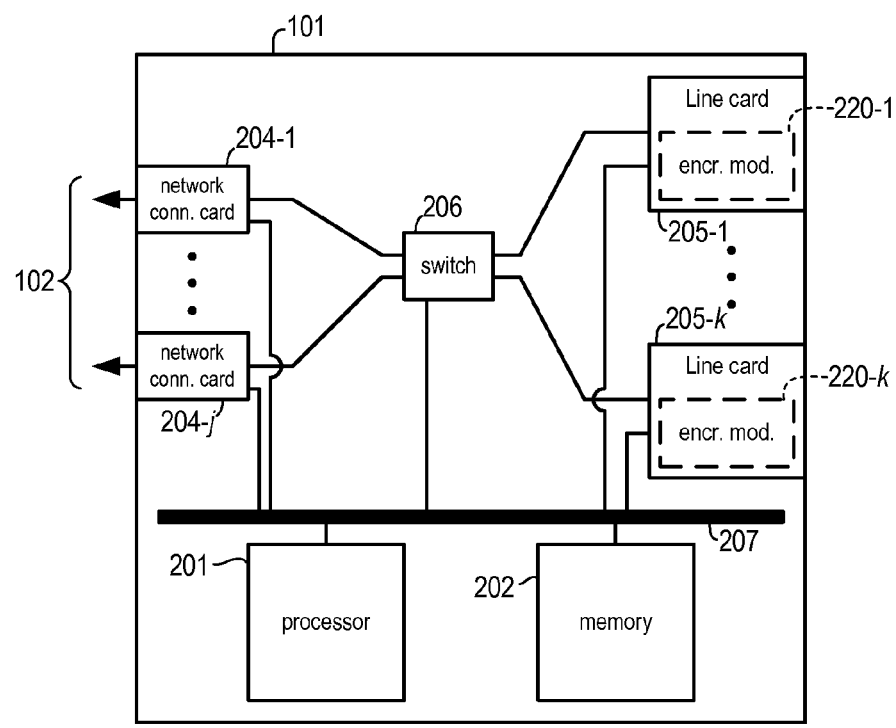
FIG. 2A is a block diagram of an access platform according to at least some embodiments.

FIG. 2A is a block diagram of access platform 101 according to at least some embodiments. Platform 101 could be, e.g., a converged multi-service access platform (CMAP) implementing features of a packet processing node and/or access nodes such as are described in U.S. patent application Ser. No. 12/732,344 (filed Mar. 26, 2010, and titled "Access Network Architecture Having Dissimilar Access Sub-networks"), a cable modem termination system (CMTS) modified to have functionality as described herein or another type of access network termination system, a PON optical line terminal (OLT), some other type of central office or central office device, or another network node (or collection of nodes). In some embodiments, elements of an access platform may be positioned in separate locations (e.g., in separate housings or separate buildings).

A processor 201 executes instructions and controls operation of platform 101 so as to carry out various operations described herein. Platform 101 further includes memory 202 storing instructions for execution by processor 201 as well as other data that is stored and/or retrieved by processor 201. Although single blocks are shown for processor 201 and for memory 202, memory and computational operations of platform 101 could respectively be distributed across multiple memory devices and multiple processors. Memory 202 may include volatile and non-volatile memory and can include any of various types of storage technology, including one or more of the following types of storage devices: read only memory (ROM) devices, random access memory (RAM) devices, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 201 may be implemented with any of numerous types of devices, including but not limited to one or more general purpose microprocessors, one or more application specific integrated circuits, one or more field programmable gate arrays, and combinations thereof. In at least some embodiments, processor 201 carries out operations described herein according to machine readable instructions stored in memory 202 and/or stored as hardwired logic gates within processor 201. Such operations may include implementation of one or more predefined data interfaces. One of those predefined data interfaces can include an encryption management data interface that is discussed in more detail below.

Platform 101 communicates with elements in a larger network, over regional network link(s) 102, using one or more network-side connection cards 204-1 through 204-*j* (hereinafter, "cards 204"). Cards 204 could be any electronic circuits, e.g., gigabit Ethernet cards. Platform 101 may communicate with end devices 105 over one or more access-side line cards 205-1 through 205-*k* (hereinafter, "line cards 205"). In some embodiments, each of line cards 205 (which may comprise more than one physical card or other structure for supporting and interconnecting components) includes one or more processors, one or more memories and one or more communication components (e.g., lasers, components for generating electrical signals, etc.) and is configured (through stored executable instructions and/or through hard-wired instructions) to forward content data downstream to one or more end devices in access network 100. Each of line cards 205 may further be configured (through stored executable instructions and/or through hard-wired instructions) to carry out additional operations as described herein. Each of line cards 205 may have multiple output ports (not shown), and may be able to simultaneously communicate over multiple frequency or other type channels through each of those ports. In some embodiments, each of cards 205 may not be an individual card (or collection of cards). For example, line cards in such embodiments might be implemented as a collection of components on a single physical card (or other structure) that supports and interconnects components of multiple line cards. In some embodiments, the operations of multiple line cards might be performed (e.g., as separate, concurrently running software/firmware routines) by a single set of processor(s), memory(ies), etc.

Different ones of line cards 205 may be configured to communicate over different types of media using different types of protocols. For example, infrastructure 103 may have an HFC portion, a PON portion and/or a wireless portion. For example, one of line cards 205 may serve a portion of end devices 105 connected to the HFC portion of infrastructure 103, another of line cards 205 may serve other end devices 105 connected to the PON portion of infrastructure 103, and yet another of line cards 205 may serve end devices 105 that communicate over the wireless portion of infrastructure 103. Particular line cards 205 may perform data encapsulation and/or other protocol conversion operations so as to accommodate the MAC (media access control) and other protocols of the infrastructure 103 portion served by the line card, and may also perform modulation and/or other operations. For example, in one type of network, a line card may perform QAM (quadrature amplitude modulation), OFDM (orthogonal frequency division multiplexing), QPSK (quadrature phase shift keying), binary modulation (e.g., on/off optical pulses) and/or other operations to generate a downstream signal that carries content data. Cards 205 may also include components for receiving and demodulating upstream communications from end devices (and be configured to further process demodulated upstream communications), or upstream communications could be received and processed by separate line cards.

Platform 101 may include a hardware or software switch 206 through which content data packets received by network-side cards 204 are routed to different ones of line cards 205. Switch 206 may also replicate data for routing to multiple line cards 205. Processor 201 accesses and controls memory 202, cards 204, line cards 205, switch 206 and other components in platform 101 by communicating with those components across a backplane 207. Processor 201 may also encapsulate, decapsulate or otherwise process packets of content data before forwarding such data from one of cards 204 to one of cards 205. In addition to forwarding content data downstream to end devices and forwarding data from end devices upstream to other network elements, platform 101 may also initiate communications (e.g., for management of access network 100). Accordingly, processor 201 may generate packets and forward those packets to cards 204 (for transmission to other elements in the larger network) or to line cards 205 (for transmission to end devices). Similarly, some communications from end devices or other network elements may terminate at processor 201 or another component of platform 101.

In at least some embodiments, some or all of line cards 205 may execute one or more encryption modules that encrypt content data under the control of a CAS device. Each encryption module represents a collection of instructions that may be executed by a line card to carry out encryption-related operations in accordance with encryption management data and in accordance with encryption control data. The instructions of the encryption module may include software, firmware, hardwired logic, and combinations thereof. As part of the encryption-related operations, an encryption module may encrypt content data by scrambling that data using an encryption key and may change that encryption key on a frequent basis. The encryption module may also forward those keys and other information needed to decrypt encrypted content data to end devices. The line card may provide such information to end devices by forwarding entitlement messages (e.g., entitlement control messages and entitlement management messages) that the encryption module has received from a CAS device.

In addition to encrypting content data with frequently changing keys, an encryption module executing in a line card may encrypt different groups of content data differently. For example, a CAS device may instruct an encryption module to encrypt content data associated with a first set of content sources in accordance with a first set of encryption management and/or encryption control data, to encrypt content data associated with a second set of content sources in accordance with a second set of encryption management and/or encryption control data, etc. The first set of sources might represent a group of providers whose content is made available to users for a particular fee, the second set of sources might represent a group of providers whose content is made available for an additional fee, etc. Content data might also be encrypted on a session-by-session basis. For instance, a CAS device might instruct an encryption module to encrypt content data associated with a particular content item (e.g., a single movie) in accordance with a particular set of encryption management and/or encryption control data. That CAS device might then instruct the module to encrypt content data for another content item (e.g., a different movie) originating from the same source in accordance with different encryption management and/or encryption control data.

In some embodiments, an encryption module executing in connection with a line card may perform operations that are similar (or identical) to those performed by encryption processes executing in existing edge devices such as edge quadrature amplitude modulator (EQAM) devices. Indeed, and as further explained below, an encryption module executed by a line card may be a slightly modified version of existing software designed in execute in an EQAM. Moreover, existing CAS devices can be used to control encryption modules in some embodiments. Unlike existing EQAM or similar devices, however, an access platform in at least some embodiments is configurable to accommodate multiple different types of encryption modules and/or to receive encryption management data from multiple different types of CAS devices.

Different line cards 205 may execute encryption modules from different sources (e.g., from different vendors) and/or may otherwise execute different types of encryption modules; different types of encryption modules may be provided by a single source or may be provided by different sources. In the example of FIG. 2A, line card 205-1 executes encryption module 220-1 provided by source (e.g., vendor) X. Operation of module 220-1 is typically in accordance with encryption management data and encryption control data generated by CAS device 104, with CAS device 104 also being supplied by vendor X. Other line cards 205 may also execute module 220-1 (or another module supplied by vendor X) under the control of CAS device 104. Line card 205-$k$ executes encryption module 220-$k$ provided by vendor Y. Operation of module 220-$k$ is in accordance with encryption management data and encryption control data generated by CAS device 106, with CAS device 106 provided by vendor Y. Other line cards 205 may also execute module 220-$k$ (or another module supplied by vendor Y) under the control of CAS device 106. Still other line cards 205 may execute an encryption module of a different source or vendor under the control of another CAS device. In some embodiments, a single line card may simultaneously execute multiple encryption modules, with each of those programs controlled by separate CAS devices.

Line cards can be equipped with different encryption modules in a variety of ways. In some cases, a line card may be manufactured by an encryption module vendor. In other cases, a line card might be manufactured by a third party. For example, a third party manufacturer could design its line cards with sufficient processing and memory capacity to satisfy the processing and memory requirements of multiple known encryption modules. A selected encryption module vendor could then load a machine language version of its encryption module on the line card (or permit another party to do so).

Figure 2B:
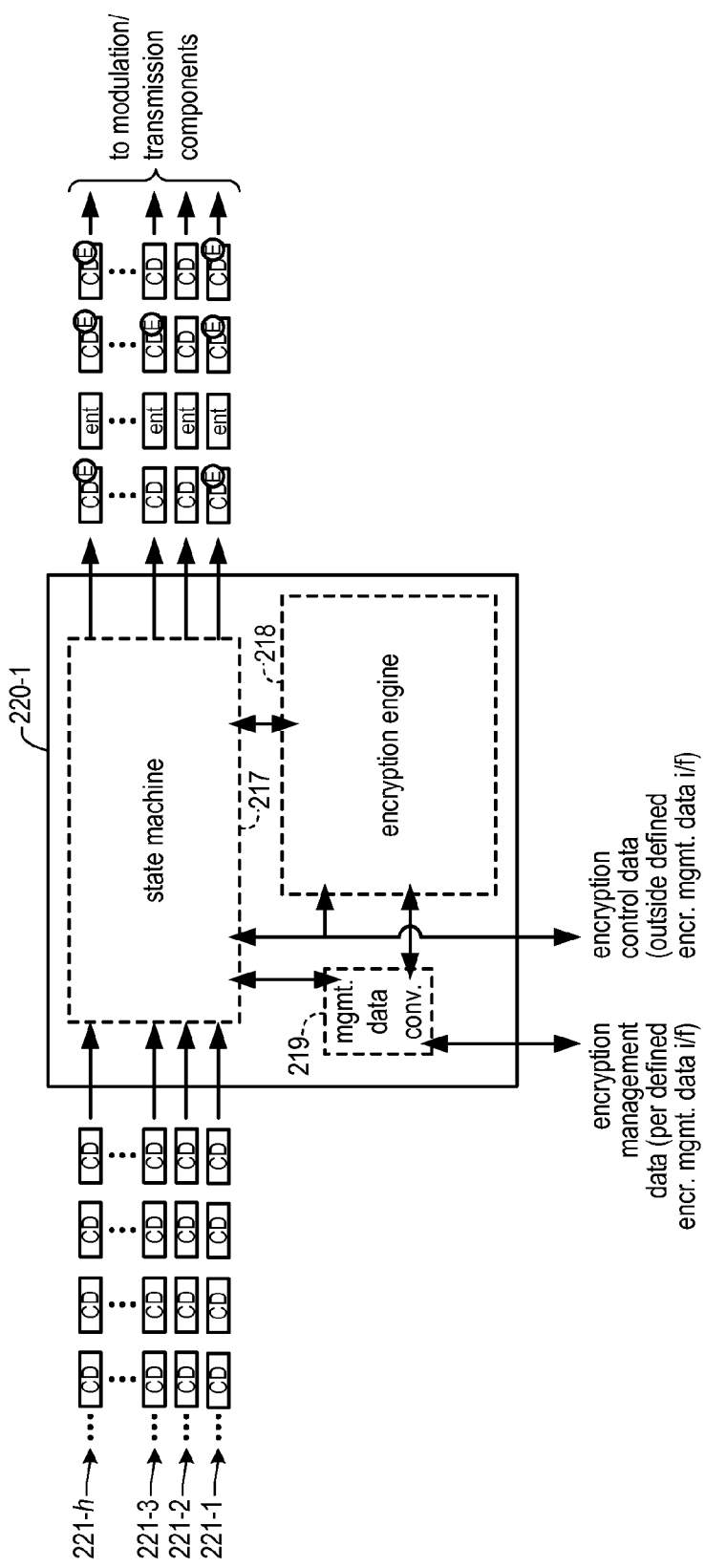
FIG. 2B is a block diagram showing operation of an encryption module according to some embodiments.

FIG. 2B is a block diagram showing operation of encryption module 220-1 according to some embodiments. Other encryption modules 220 may operate in a similar manner. In at least some embodiments, encryption modules 220 carry out encryption-related operations in accordance with at least two types of data. A first type of data, encryption management data, includes settings, parameters and other information that can be used to set up or otherwise configure a module 220 for one or more encryption sessions. Example types of encryption management data include, but are not limited to, the following: encryption algorithm to be used, mode of operation for encryption algorithm, control word source (e.g., line card or CAS), cryptoperiod value, protocol to retrieve encryption control data (e.g., push or pull), method for encapsulating ECMs (encryption control messages) in streams sent to end devices, method to edit transport stream header of an encrypted packet, method to fail over from one CAS device to another, digital signature method(s) to be used, HMAC (Hash-based Message Authentication Code) methods/algorithms to be used, initialization vectors, root keys, globally unique ID(s), seed values, seed keys, hash algorithm(s) to be used, asymmetric key data for private key derivation, cryptographic periods of keys, key ladder levels, key ladder settings, residual key processing method to be used, major frame counter values, minor frame counter values, count up/count down direction, key wrapping algorithms, data tables, etc. In at least some embodiments, and as described in more detail below, a CAS device provides encryption management data to a module 220 using a standardized encryption management data interface.

Encryption control data is a second type of data that may be used by modules 220 to perform encryption-related operations. Encryption control data includes run-time information that is provided to an encryption module during an encryption session. Examples of encryption control data can include control words (keys), metadata describing keys, signatures and key rotation data (e.g., packages of keys and/or instructions on how often to change keys in a key package). Encryption control data can also include entitlement messages such as ECMs and EMMs (encryption management messages) that an encryption module encapsulates and forwards to end devices. In some embodiments, a CAS device provides encryption control data to an encryption module without using the standardized interface used to provide the encryption management data.

Returning to FIG. 2B, a plurality of transport streams 221-1 through 221-h are input to encryption module 220-1. Each of streams 221 may contain a stream of content data (CD) protocol data units (PDUs). Separation of content data PDUs into individual transport streams may be performed by other processes executing on line card 205-1 or may occur prior to receipt of content data by line card 205-1.

Encryption module 220-1 may include a state machine 217, an encryption engine 218 and a management data converter 219. Encryption engine 218 may include instructions executable to encrypt data using one or more encryption algorithms. Those encryption algorithms can be conventional algorithms such as DES, 3DES, etc. Encryption engine 218 may, for example, receive unencrypted content data from state machine 217, encrypts that content data using encryption keys, and return encrypted content data to state machine 217.

State machine 217 may receive incoming content data streams and cause various parts of those streams to be encrypted. State machine 217 may also encapsulate entitlement messages received in control data and insert those encapsulated entitlement messages into the streams. State machine 217 may then output those streams to other components of line card 205-1 for modulation and transmission. In FIG. 2B, entitlement messages are represented in the output streams as "ent," and encrypted content data PDUs include a circled "E" in one corner. All content data in some streams may be encrypted (e.g., as in streams 221-1 and 221-h). Some streams may have no encryption (e.g., stream 221-2). Still other streams may be only partially encrypted (e.g., stream 221-3). Although not explicitly shown in FIG. 2B, all streams (or all PDUs in a particular stream) need not be encrypted in the same manner. For example, state machine 217 may cause encryption engine 218 to use different encryption keys and/or different encryption algorithms for different streams and/or for different PDUs within a stream.

Operation of state machine 217 and/or encryption engine 218 may be configured by encryption management data generated by CAS device 104 and received via management data converter 219. Management data converter 219 may receive encryption management data that is formatted or otherwise in accordance with a pre-defined encryption management data interface and convert that management data to form usable by state machine 217 and/or encryption engine 218. In particular, state machine 217 may be configured to process encryption management data in a particular proprietary format, for example, a format that is proprietary to source vendor X. In some embodiments, encryption engine 218 and state machine 217 may be pre-existing encryption software designed, and provided by vendor X, for operation on an EQAM or other conventional device.

Encryption control data used by state machine 217 and/or encryption engine 218 also may originate from CAS device 104. Although encryption management data and encryption control data may be provided to line card 205-1 over the same physical interface, different logical interfaces can be used to provide management and control data to module 220-1. One of those logical interfaces corresponds to the standardized interface for encryption management data and is used to direct encryption management data to management data converter 219. Another of those logical interfaces is used to pass encryption control data directly to state machine 217 and encryption engine 218 without passing through converter 219.

CAS device 104 (FIG. 1), which may generate the encryption management data and the encryption control data, may be a conventional CAS device. Such devices can take the form of a server, a server blade, or other type of computing device that is configured to receive input from a network or operator according to a user interface defined by the CAS vendor. Such input could specify the strength of encryption to be employed, the frequency with which encryption keys should change, the data or data streams to be encrypted, whether certain streams should be encrypted with the same entitlement or entitlement groups, the end devices entitled to receive and decrypt certain content, etc. Software within CAS device 104, which software may be proprietary to source or vendor X, outputs appropriate encryption management data to configure encryption module 220-1 for operation in accordance with the network operator input.

After module 220-1 has been configured, CAS device 104 may output encryption control data to control the ongoing execution of module 220-1. CAS device 104 may provide encryption management data and encryption control data to line card 205-1 (and thus to module 220-1) over the same physical connection, and both types of data may pass through encryption manager 109. In some embodiments, however, and as discussed below, only the encryption management data from CAS device 104 is processed by encryption manager 109 so as to conform to a predefined and standardized common encryption management data interface.

CAS device 106, which may also be a conventional CAS device, may operate in a manner similar to that of CAS device 104. CAS device 106 executes software (which may be proprietary to another source or vendor Y) that receives input from the operator of network 100 and that generates encryption management data and encryption control data that respectively configure and control operation of encryption module 220-k so as to encrypt content in accordance with the network operator's input.

Although CAS devices of different types and/or from various sources or vendors may output the same or similar types of encryption management data, they may do so in different ways. For example, vendor X may use a first format for some types of management data, while vendor Y may use a second format that differs significantly. For example, vendor X may permit inclusion of multiple types of encryption management data in a single PDU (protocol data unit) and require that data types in that PDU be in a specified order and/or have specific delimiters between data fields. Conversely, vendor Y might require that data types within a PDU be in a different order and/or utilize different delimiters. There can be numerous other variations in the manner by which CAS devices from different vendors provide encryption management data.

Because of differences between the CAS devices (e.g., devices from different vendors), software executing within processor 201 of access platform 101 might not understand or be able to handle an encryption management data message unless processor 201 were programmed to recognize the data formats and other requirements specific to each vendors' CAS device. However, some CAS device vendors may not wish to provide such information to a network operator or other third party. Moreover, creating software capable of recognizing and processing encryption management data in numerous possible formats could become unwieldy.

So that platform 101 can receive encryption management data originating at different CAS devices and provide that management data to encryption modules executing on various of line cards 205, and to avoid exposing aspects of encryption modules or CAS devices to the operator of platform 101, a predefined common encryption management data interface may be employed. In particular, platform 101 is configured to accept encryption management data that is formatted according to the predefined common encryption management data interface and to pass that encryption management data to a specific line card. A management data converter of an encryption module executing within a line card can then convert the encryption management data from the predefined interface formatting to a form usable by other portions of the encryption module. Neither the operator of platform 101 nor the manufacturer of a line card, for example, needs to know the specifics of how an encryption module or its associated CAS device operates. Moreover, an operator of platform 101 can readily change an encryption module by replacing a line card or by simply installing a new encryption module into an existing line card. Even if a new encryption module must receive its encryption management data from a new CAS, the common encryption management data interface allows the new CAS device to communicate with the newly installed encryption module.

The precise details of a predefined encryption management data interface used by an access platform will vary in different embodiments. In at least some embodiments, for example, the encryption management data interface may define a format for various types of encryption management data. As another example, the encryption management data interface may define specific numbers or other values that act as recognized identifiers for a particular data type (e.g., "00001" in a header indicates a subsequent value is one type of encryption management data, "00002" in a header indicates that a subsequent value is another type of encryption management data). As yet another example, the encryption management data interface may require that all encryption management data have a header identifying the data as encryption management data. Additional non-limiting examples of the types of details defined by an encryption management data interface could include: format for destination (e.g., line card) identifier, formats for data frames including multiple data elements, etc.

In at least some embodiments, a server, a server blade or other type of computing device is configured to act as an encryption manager (EM). An encryption manager may correspond to a specific type of CAS device (e.g., a CAS device of a particular vendor). In operation, the encryption manager receives encryption management data from its corresponding CAS device, which data may be in a proprietary format used by the vendor of the CAS device. The encryption manager then converts that management data so as to be compliant with the common encryption management data interface recognized by an access platform and forwards that converted encryption management data to the access platform. In embodiments according to FIGS. 1-3F, encryption manager 109 may receive encryption management data from CAS device 104, convert that management data to comply with the encryption management data interface of platform 101, and forward the converted data to platform 101. Similarly, encryption manager 110 may receive encryption management data from CAS device 106, convert that management data to comply with the encryption management data interface of platform 101, and forward the converted data to platform 101.

In some embodiments, a CAS device can be modified to perform the conversion operations of an encryption manager. However, a separate encryption manager allows use of preexisting CAS devices and can provide other advantages.

FIGS. 3A-3F are diagrams showing use of an encryption management data interface 300 according to some embodiments. In these figures, encryption management data interface 300 is shown as a stippled box superimposed on the edge of a box representing platform 101. As can be appreciated by persons of ordinary skill in the art, this graphical representation of encryption management data interface 300 is only for convenience, and interface 300 is not a physical opening in platform 101. Instead, encryption management data interface 300 may comprise a series of instructions programmed within memory 202 and/or processor 201 of platform 101 and within memory(ies) (and/or processor(s)) of individual line cards 205 (FIG. 2). These instructions may, among other things, define formatting and other rules for encryption management data and permit processor 201 to recognize and route data that complies with the defined formatting and other rules. Data that has been converted to comply with interface 300 is shown in FIGS. 3A-3F by a stippling pattern similar to that used to show interface 300.

Figure 3A:
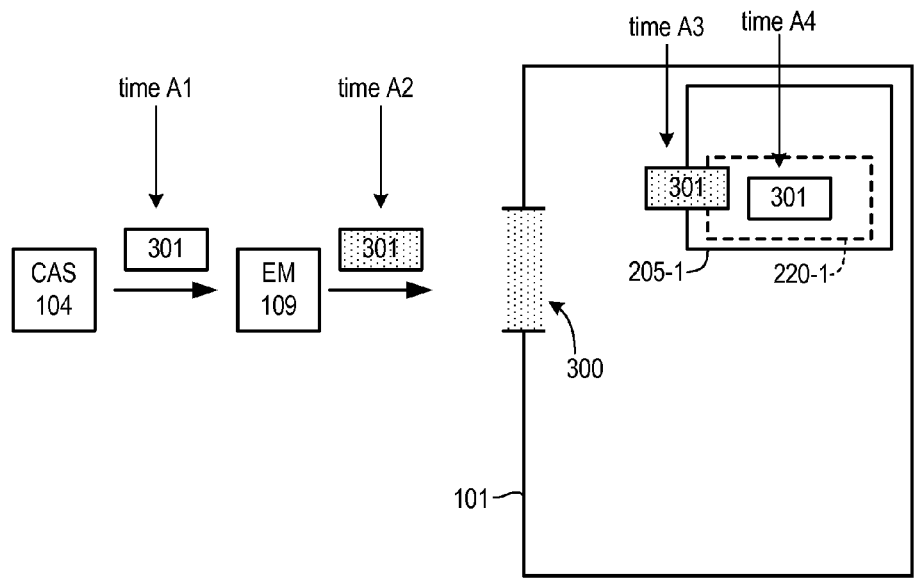
FIGS. 3A-3F are diagrams showing use of an encryption management data interface according to at least some embodiments.

In FIG. 3A, CAS device 104 generates and transmits an item of encryption management data 301 at time A1. Item 301 can be any of various types of data that might be used to configure an encryption module. In some embodiments, data 301 could include multiple encryption management data items of multiple types. Encryption manager 109 may reformat and otherwise convert data 301 according to interface 300 and forwards the converted data to platform 101 (time A2).

Data 301 is subsequently received by platform 101. Because data 301 conforms to data interface 300, processor 201 recognizes data 301 as encryption management data and can determine that data 301 should be sent to line card 205-1. Processor 201 forwards data 301 to line card 205-1 (time A3). Line card 205-1 also recognizes data 301 as conforming to data interface 300, and thus forwards data 301 to encryption module 220-1. Data converter 219 (FIG. 2B) then converts the received encryption management data to a format recognized by state machine 217 and/or encryption engine 218. The converted data is then used to configure state machine 217 and/or encryption engine 218 (time A4).

As explained above, encryption module 220-1 in some embodiments may be a pre-existing encryption program (usable, e.g., in an EQAM device) that has been slightly modified to recognize encryption management data formatted according to data interface 300. This modification can take the form of one or more added routines that act as management data converter 219 (FIG. 2B). In essence, such converter routines would invert the operations performed by encryption manager 109.

Figure 3B:
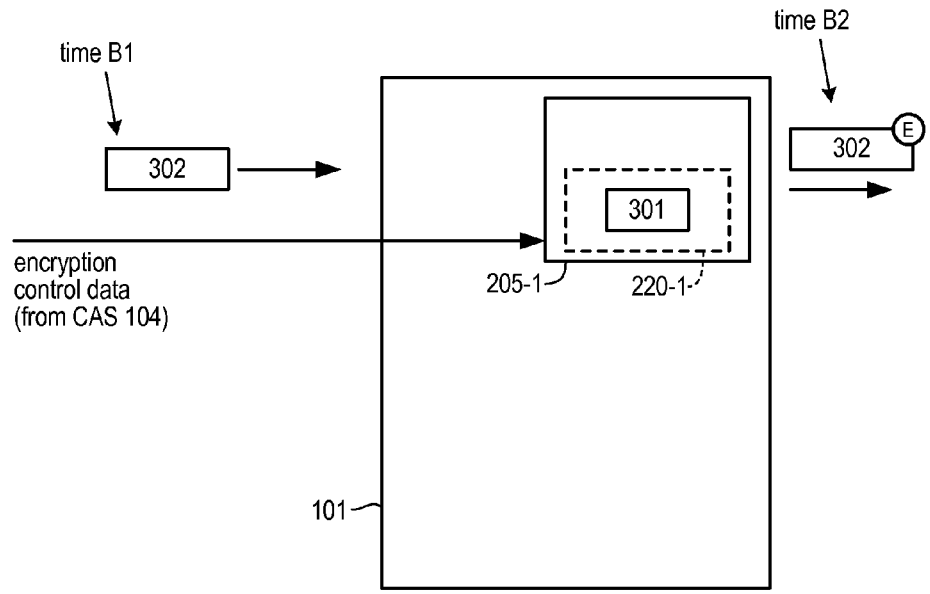

FIG. 3B shows platform 101 encrypting content data in accordance with a configuration resulting from encryption management data 301. At time B1, content data 302 is received at platform 101. Content data 302 is subsequently routed to line card 205-1 and encrypted by encryption module 220-1 in accordance with the configuration of encryption management data 301, and using encryption control data provided to encryption module 220-1 at runtime (outside of interface 300) by CAS device 104. For simplicity, this encryption is represented in FIG. 3B with a circled "E" in one corner of data 302. After encryption by program 220-1, encrypted content data 302 is forwarded downstream to one or more of end devices 105 (time B2).

Figure 3C:
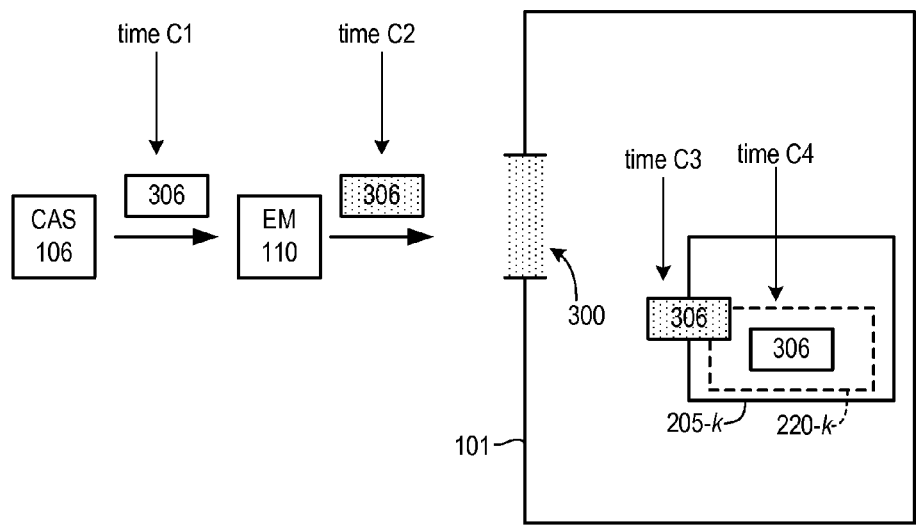
Figure 3D:
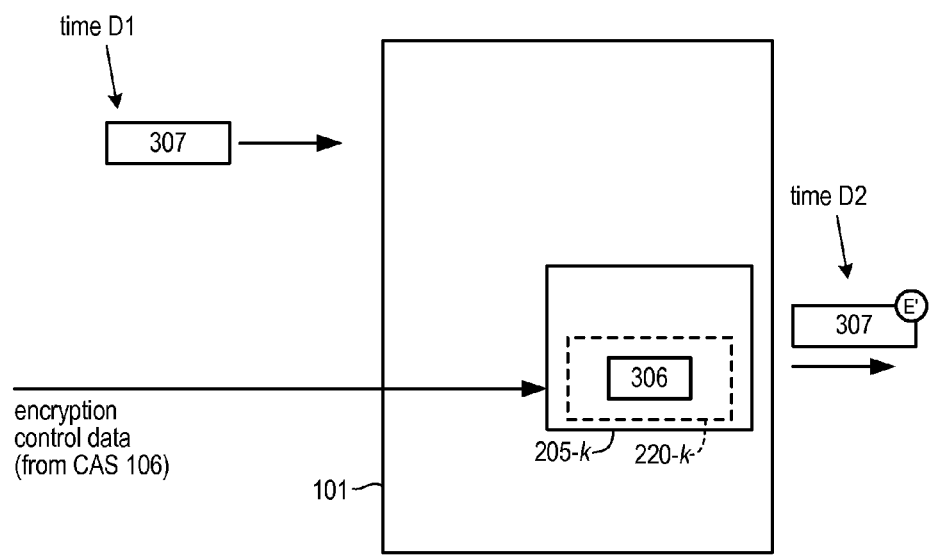

In FIG. 3C, CAS device 106 generates and transmits an item of encryption management data 306 at time C1. Time C1 can be before, after or concurrent with the times in FIGS. 3A and 3B. In the example of FIGS. 3C and 3D, encryption management data item 306 could be the same type of data as data 301 of FIGS. 3A and 3B, but have a different value. CAS device 106 outputs encryption management data in a format different from that used by CAS device 104. Encryption manager 110 converts data 306 according to encryption management data interface 300 and forwards converted data 306 to platform 101 (time C2).

Data 306 is subsequently received by platform 101. Because data 306 conforms to data interface 300, processor 201 recognizes data 306 as encryption management data and can determine that data 306 should be sent to line card 205-$k$. Processor 201 forwards data 306 to line card 205-$k$ (time C3). Line card 205-$k$ also recognizes data 306 as conforming to encryption management data interface 300, and thus forwards data 306 to encryption module 220-$k$. A data converter in module 220-$k$ (which may be similar to data converter 219 of FIG. 2B) then converts the received encryption management data to a format recognized by a state machine and/or encryption engine of module 220-$k$. The converted data is then used to configure that state machine and/or that encryption engine (time C4). In some embodiments, encryption module 220-$k$ may also be a pre-existing encryption program (usable, e.g., in an EQAM device) that has been slightly modified to recognize data formatted according to data interface 300.

FIG. 3D shows platform 101 encrypting content data using a configuration resulting from management data 306. At time D1, content data 307 is received at platform 101. Content data 307 is subsequently routed to line card 205-$k$ and encrypted by encryption module 220-$k$ in accordance with the configuration of encryption management data 306, and using encryption control data provided to encryption module 220-$k$ at runtime (outside of interface 300) by CAS device 106. For simplicity, this encryption is represented in FIG. 3D with a circled "E" in one corner of data 307. After encryption by module 220-$k$, encrypted content data 307 is forwarded downstream to one or more of end devices 105 (time D2).

Figure 3E:
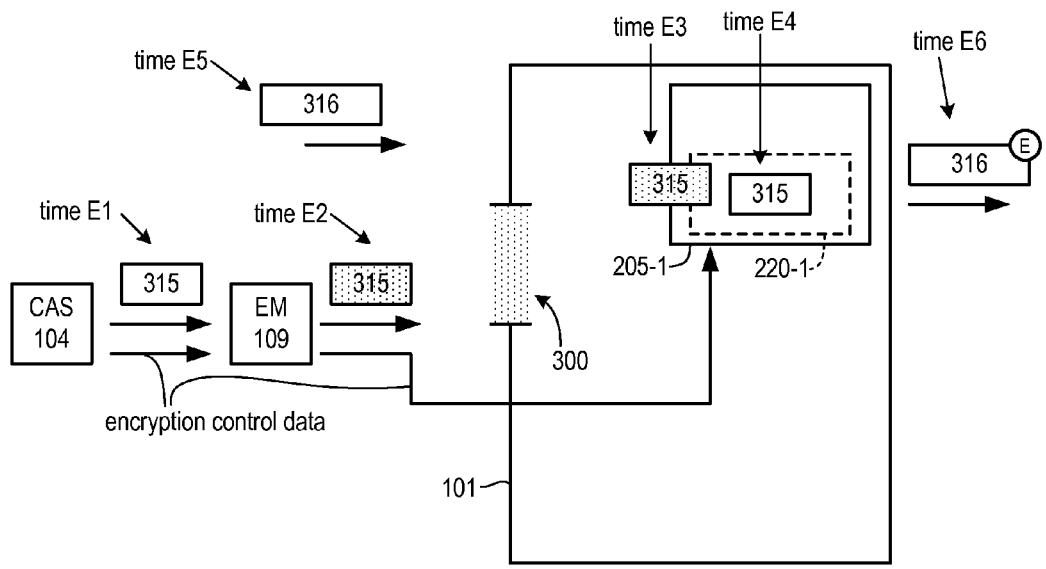

FIG. 3E shows an additional example of encryption management data sent from CAS device 104 and actions by encryption module 220-1 in accordance with such encryption management data. Similar types of management data could be sent by CAS device 106 (and/or other CAS devices) and similar actions taken by encryption module 220-$k$ (and/or other encryption modules). CAS device 104 sends new encryption management data item 315 at time E1, with E1 being after B2 (FIG. 3B). Encryption manager 109 converts data item 315 according to encryption management data interface 300 and forwards the converted data to platform 101 (time E2). Converted data item 315 is received by platform 101 and routed to line card 205-1 (time E3). Data converter 219 (FIG. 2B) of encryption module 220-1 then converts the received encryption management data to a format recognized by state machine 217 and/or encryption engine 218. The converted data is then used to reconfigure state machine 217 and/or encryption engine 218 (time E4). Subsequently, content data 316 is received (time E5). Using encryption control data provided to encryption module 220-1 (which encryption control data may pass through encryption manager 109 but outside of interface 300), content 316 is encrypted based on the reconfiguration from data item 315. Encrypted content item 316 is then forwarded to one or more end devices (time E6).

Figure 3F:
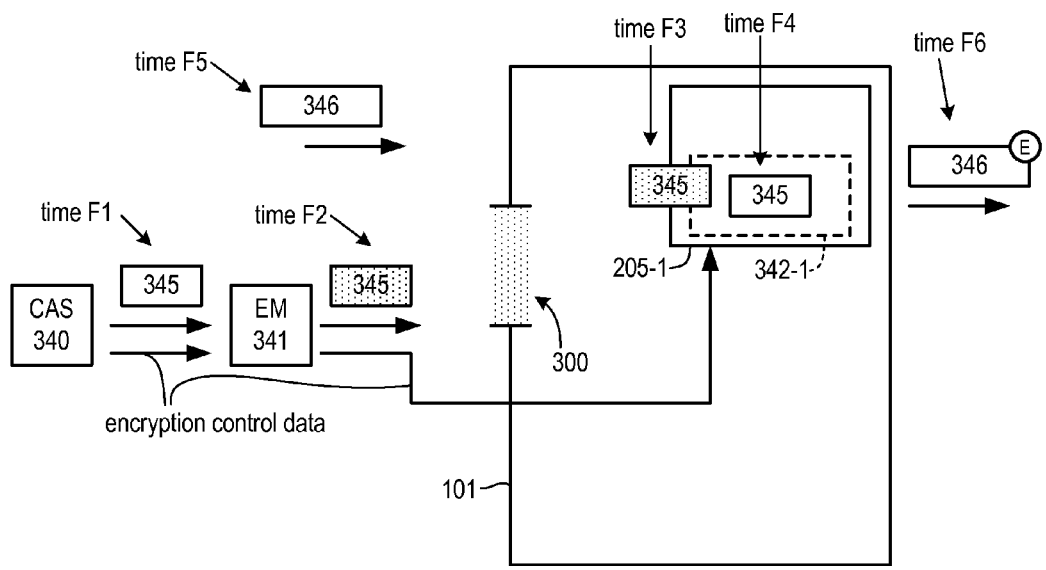

FIG. 3F shows operations performed after encryption module 220-1 has been removed from line card 205-1 and a new encryption module 342-1 has been installed. In the example of FIG. 3F, encryption module 342-1 is provided by source or vendor V and is configured by encryption management information originating in CAS device 340 (also provided by vendor V). An encryption manager 341 receives encryption management data from CAS device 340 that is in a format proprietary to vendor V and converts such data to conform to management data interface 300. Module 342-1 includes a converter (similar to converter 219 of FIG. 2B) that converts encryption management data conforming to interface 300 to the vendor V proprietary format. CAS device 340 and encryption manager 341 can each be a server, server blade or other computing device.

CAS device 340 sends an encryption management data item 345 at time F1, with F1 being after B2 (FIG. 3B). Encryption manager 341 converts data item 345 according to data interface 300 and forwards the converted data to platform 101 (time F2). Converted data item 345 is received by platform 101 and routed to line card 205-1 (time F3). The data converter in module 342-1 then converts the received encryption management data 345 to a format recognized by a state machine and/or encryption engine of module 342-1. The converted data is then used to configure that state machine and/or that encryption engine (time F4). Subsequently, content data 346 is received at time F5. Content data 346 is encrypted using encryption control data provided to encryption module 342-1 (which encryption control data may pass through encryption manager 109 but outside of interface 300) and forwarded to one or more end devices (time F6).

Various of the steps discussed in connection with FIGS. 3A-3F may be supplemented by other steps, omitted, performed in a different order relative to other steps, and/or otherwise be modified.

Figure 4:
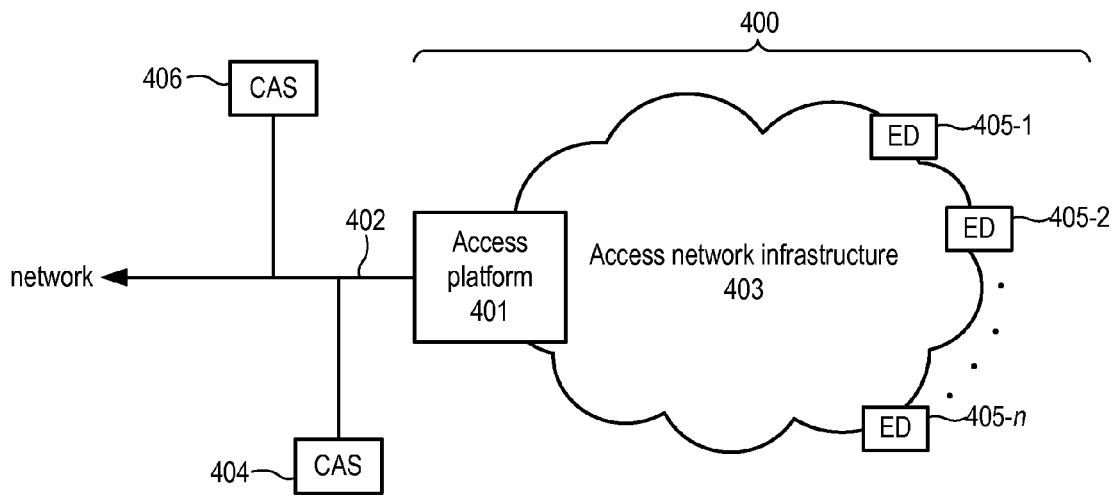
FIG. 4 is a block diagram showing elements in an access network according to some additional embodiments.

FIG. 4 is a block diagram showing elements in an access network 400 according to some additional embodiments Infrastructure 403 can be any of the types of infrastructures (or combinations of infrastructure types) described in connection with FIG. 1, or other infrastructures. Similarly, end devices 405-1 through 405-$n$ can be any of the types of end devices described in connection with FIG. 1 and can operate in a manner similar to that of the previously described end devices.

Except as discussed below, access platform 401 may be similar to access platform 101 of FIG. 1 and performs similar operations. As with access platform 101, for example, access platform 401 may receive content data over one of regional network link(s) 402, encrypt that content data, and distribute that encrypted content data to end devices. CAS devices 404 and 406 are respectively similar to CAS devices 104 and 106 of FIGS. 1-3F. Unlike the embodiments of FIG. 1, however, and as discussed below, encryption managers are not interposed between CAS device 404 and platform 401 or between CAS device 406 and platform 401.

Figure 5:
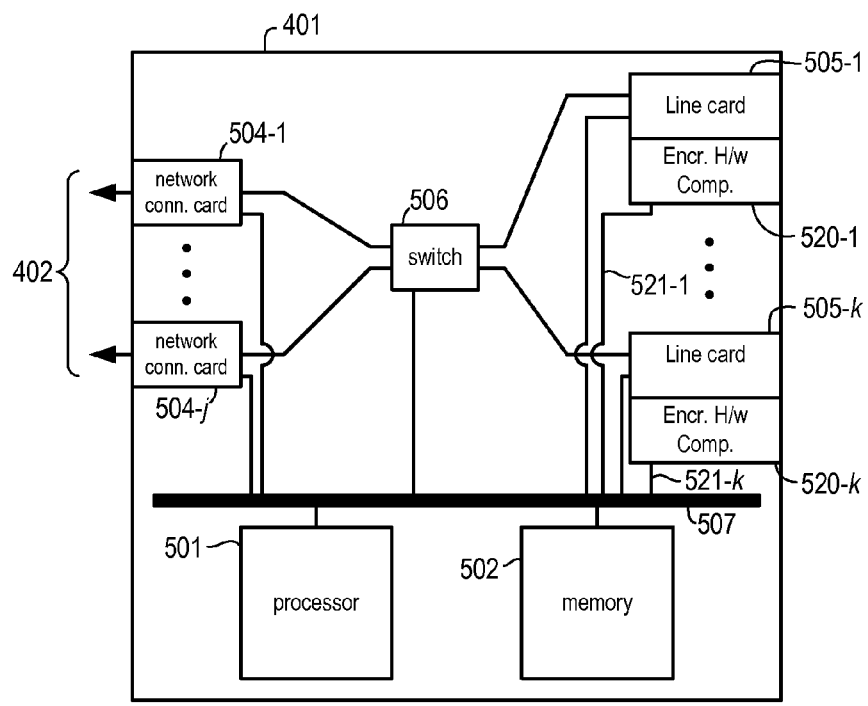
FIG. 5 is a block diagram of an access platform according to at least some additional embodiments.

FIG. 5 is a block diagram of access platform 401. Cards 504-1 through 504-j, switch 506 and backplane 507 are respectively similar to (and may operate in a similar manner as) cards 204-1 through 204-j, switch 206 and backplane 207 of FIG. 2A. Processor 501 and memory 502 are respectively similar to processor 501 and memory 502 of FIG. 2A, except that memory 502 and/or processor 501 may not store instructions representing a predefined encryption management data interface such as interface 300 (FIGS. 3A-3F).

Each of line cards 505-1 through 505-k is respectively similar to line cards 205-1 through 205-k of FIG. 2A in certain ways. Specifically, each of line cards 505-1 through 505-k includes one or more processors, one or more memories and one or more communication components (e.g., lasers, components for generating electrical signals, etc.) and is configured to forward content data downstream to one or more end devices in access network 400. Each of line cards 505 may have multiple output ports (not shown), and may be able to simultaneously communicate over multiple frequency channels (or multiple channels of other types) through each of those ports. Similarly, different ones of line cards 505 may be configured to communicate over different types of media using different types of protocols. For example, one of line cards 505 may serve a portion of end devices 405 connected to an HFC portion of infrastructure 403, another of line cards 505 may serve other end devices 405 connected to a PON portion of infrastructure 403, and yet another of line cards 505 may serve end devices 405 that communicate over the wireless portion of infrastructure 403.

Unlike line cards 205, each of line cards 505 may be connected to a replaceable encryption hardware component 520 having processors and memory configured to execute an encryption module. Each encryption hardware component may receive unencrypted content data from its connected line card. The encryption module executed in the encryption hardware component encrypts that content data and passes the encrypted content data back to the connected line card for communication to one or more of end devices 405. The encryption module of the encryption hardware component may also provide entitlement messages to its connected line card so that the line card can forward those entitlement messages to end devices. Each of encryption hardware components 520 receives communications, directly from its associated CAS device, that contain encryption management data and encryption control data. Data received from a CAS device by one of components 520 may be in a format proprietary to the vendor of the encryption hardware component and/or its associated CAS device.

In the example of FIG. 5, line card 505-1 is connected to encryption hardware component 520-1 provided by source or vendor W. An encryption module in component 520-1 is configured by encryption management data generated by CAS device 404 and is controlled by encryption control data also generated by CAS device 404, with CAS device 404 also being supplied by vendor W. Other line cards 505 may be connected to an encryption hardware component similar to component 520-1 (or another encryption hardware component supplied by vendor W) configured and controlled by CAS device 404. Line card 505-k is connected to encryption hardware component 520-k provided by source or vendor Z. Component 520-k is configured and controlled by encryption management data and encryption control data generated by CAS device 406, with CAS device 406 provided by vendor Z. Other line cards 505 may be connected to an encryption hardware component similar to component 520-k (or another encryption hardware component supplied by vendor Z) that is configured and controlled by CAS device 406. Still other line cards 505 may be connected to an encryption hardware component of a different vendor that is configured and controlled by another CAS device.

Encryption hardware component 520-1 receives encryption management and control data over communication path 521-1. In some embodiments, CAS device 404 sends encryption management and control data to component 520-1 by sending such data to platform 401 along with an identifier (e.g., a MAC address) of component 520-1. Processor 501 is configured to simply forward all data identifying to component 520-1 to component 520-1. Similarly, CAS device 406 sends encryption management and control data to encryption hardware component 520-k by sending such data to platform 401 along with a MAC address or other identifier of component 520-k. Processor 501 is similarly configured to simply forward all data identifying component 520-k to component 520-k.

Figure 6A:
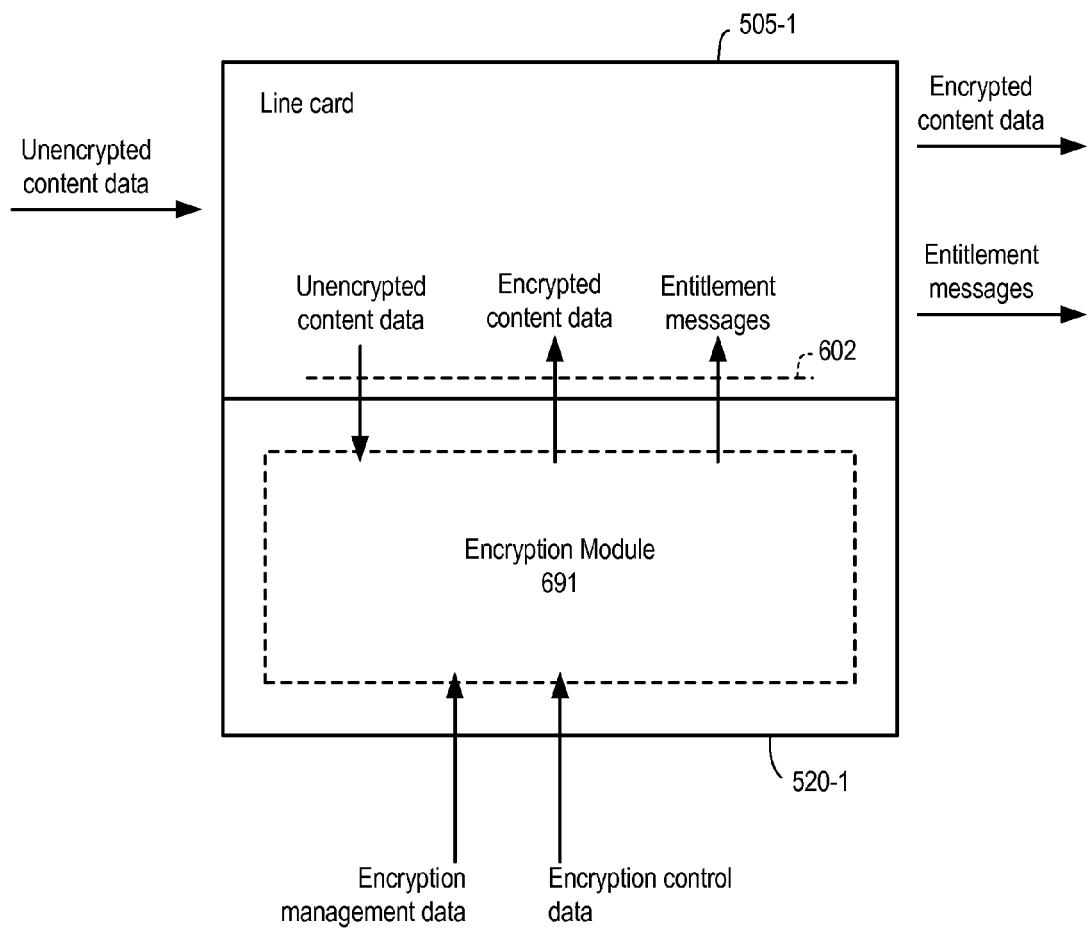
FIGS. 6A-6C are block diagrams showing operation of line cards according to some embodiments.
Figure 6B:
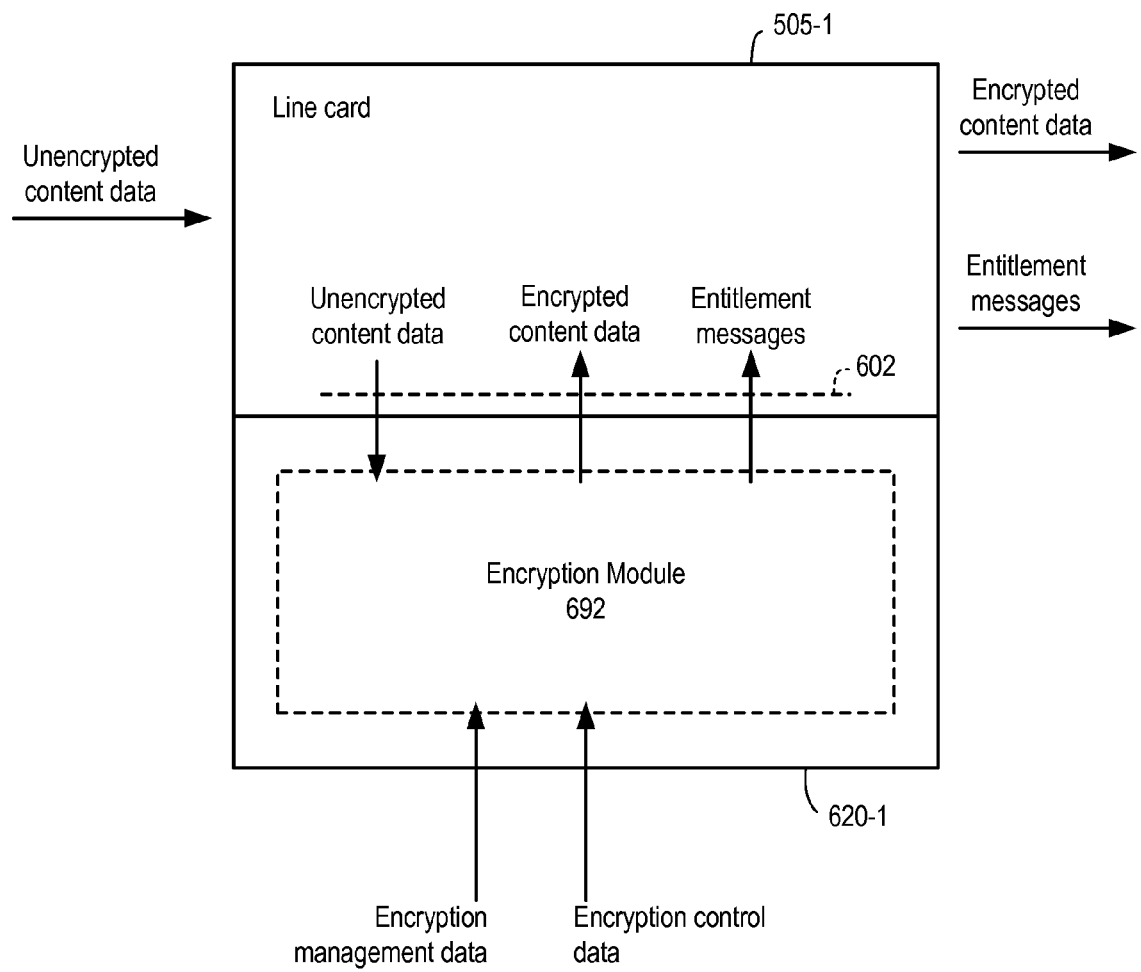

FIG. 6A is a block diagram showing operation of line card 505-1 and encryption hardware component 520-1 according to some embodiments. Other line cards and their connected encryption hardware components may operate in a similar fashion. As previously indicated, memory 502 of platform 401 may not need to store instructions implementing a predefined encryption management data interface. Instead, encryption hardware component 520-1 receives encryption management and control data in a format native to CAS 404 and/or component 520-1 and passes that data to encryption module 691. Memory within line card 505-1 stores instructions that define a standard data interface 602. Each of line cards 505 similarly includes stored instructions defining the same standard data interface 602. Interface 602 defines formatting and other rules for passing unencrypted data to an encryption module executing in a connected encryption hardware component, for receiving encrypted content data from that encryption module, and for receiving entitlement messages from that encryption module. In this manner, any of line cards 505 can be connected to any type of encryption hardware component, so long as the encryption hardware component is configured to exchange data with a line card in accordance with the requirements of data interface 602. Moreover, a line card can be disconnected from one encryption hardware component and connected to another encryption hardware component that executes a different encryption module. This is shown in FIG. 6B, where encryption hardware component 520-1 has been replaced with encryption hardware component 620-1. Encryption hardware component 620-1 executes a different encryption module 692 and receives encryption management and control data from a CAS device other than CAS device 404.

Figure 6C:
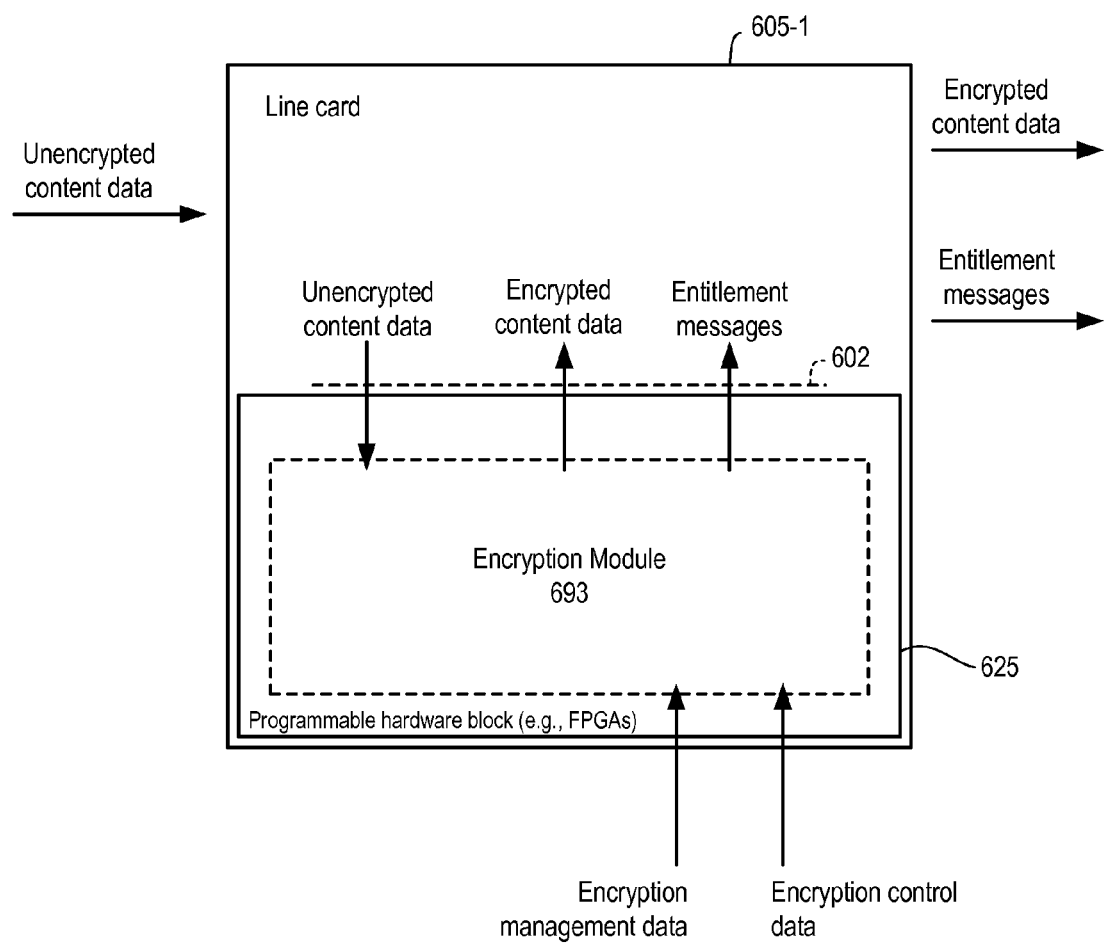

Instead of being connectable to different encryption hardware components (e.g., supplied by different vendors), each of multiple line cards according to some embodiments may simply include a standardized programmable block of FPGAs and/or other type(s) of programmable hardware devices. This is shown in FIG. 6C, where line card 605-1 includes a block 625 of programmable hardware. Block 625 is configured to execute an encryption module 693. Line card 605-1 could be used, e.g., in platform 401 instead of one of line cards 505. A direct connection (similar to connections 521 of FIG. 5) can be provided for communication of encryption management and control data to programmable block 625 and for passing of that data to encryption module 693. In the embodiment of FIG. 6C, interface 602 instead defines rules for exchange of content data and entitlement messages with an encryption module executing in programmable block 625. Another data interface can be defined (e.g., within the memory or processor of an access platform housing the line card) that specifies the format and rules by which a CAS device or other element can provide programming data to the programmable hardware block so as to configure that block to operate as an encryption module. Block 625 can be reprogrammed to execute a different encryption module and/or to be controlled by a different CAS device.

In some embodiments, a line card may also be configured to perform decryption operations. In particular, content data may be encrypted for communication over regional network links (such as link 102 of FIG. 1) used to provide content data to an access platform. Prior to encrypting that content data for transmission to end devices over an access network, the content data could be decrypted from the regional network encryption. This decryption could be performed by the same encryption module used by a line card for encryption, or the decryption could be performed by a separate module. In some embodiments, a decrypting module (or the decrypting portion of an encryption module) could also be configured using management data provided through a predefined common interface.

Embodiments also include one or more tangible, non-transitory, machine-readable storage media (e.g., a CD-ROM, CD-RW, DVD, floppy disc, FLASH memory, RAM, ROM, magnetic platters of a hard drive, etc.) that store instructions executable by one or more processors to carry out one or more of the operations described herein. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention.

The invention claimed is:

1. A method comprising:
receiving, at a computing device via an encryption management data interface, a first set of encryption management data corresponding to a first conditional access device and a second set of encryption management data corresponding to a second conditional access device;
configuring, by the computing device, a first encryption module and a second encryption module respectively based on the first set of encryption management data and the second set of encryption management data;
receiving, at the computing device via one or more interfaces different from the encryption management data interface, a first set of encryption control data and a second set of encryption control data; and
encrypting, by the configured first encryption module and the configured second encryption module, a first set of content data based on the first set of encryption control data to produce an encrypted first set of content data and a second set of content data based on the second set of encryption control data to produce an encrypted second set of content data, respectively.

2. The method of claim 1, wherein the first set of encryption management data comprises one or more of encryption settings or encryption parameters, and wherein the first set of encryption control data comprises one or more of control words or entitlement control messages (ECMs).

3. The method of claim 2, wherein the receiving the first set of encryption management data is from an encryption manager configured to convert the first set of encryption management data from a format associated with the first conditional access device to a format associated with the encryption management data interface.

4. The method of claim 1, wherein the computing device is a line card, wherein receiving the first set of encryption management data and the second set of encryption management data comprises:
receiving the first set of encryption management data in a standard format associated with the encryption management data interface, the standard format being different from a first format associated with the first conditional access device; and
receiving the second set of encryption management data in the standard format, the standard format being different from a second format associated with the second conditional access device, wherein the first format is different from the second format.

5. The method of claim 4, wherein the line card is one of a plurality of line cards of an access network platform over which content data is forwarded to one or more end devices in an access network.

6. The method of claim 1, wherein the computing device is a line card, the method further comprising:
removing, from the line card, the first encryption module; and
installing, at the line card, a third encryption module.

7. The method of claim 1, further comprising:
modulating the encrypted first set of content data and the encrypted second set of content data with one or more downstream transmission signals.

8. The method of claim 1, further comprising:
converting the first set of encryption management data from a format associated with the encryption management data interface to another format.

9. A method comprising:
receiving, at a computing device via an encryption management data interface, a first set of encryption management data associated with a first conditional access device and a second set of encryption management data associated with a second conditional access device;
converting the first set of encryption management data from a format associated with the encryption management data interface to a first format and the second set of encryption management data from the format associated with the encryption management data interface to a second format different from the first format;
configuring a first encryption module of the computing device based on the first set of encryption management data in the first format and a second encryption module of the computing device based on the second set of encryption management data in the second format; and
encrypting, by the configured first encryption module and the configured second encryption module, a first set of content data based on a first set of encryption control data to produce an encrypted first set of content data and a second set of content data based on a second set of encryption control data to produce an encrypted second set of content data, respectively.

10. The method of claim 9, wherein the first set of encryption management data comprises one or more encryption settings or encryption parameters, and wherein the first set of encryption control data comprises one or more of control words or entitlement control messages (ECMs).

11. The method of claim 10, further comprising,
receiving, at the computing device via one or more interfaces different from the encryption management data interface, the first set of encryption control data and the second set of encryption control data.

12. The method of claim 9, further comprising:
modulating the encrypted first set of content data with one or more signals.

13. The method of claim 9, wherein the computing device is a line card, the method further comprising:
removing, from the line card, the first encryption module; and
installing, at the line card, a third encryption module.

14. The method of claim 9, further comprising:
receiving, at the computing device from a source via one or more interfaces different from the encryption management data interface, the first set of content data.

15. A method comprising:
receiving, at a computing device, a plurality of sets of encryption settings corresponding to a plurality of conditional access devices;
configuring, by the computing device, a plurality of encryption modules respectively based on the plurality of sets of encryption settings;
receiving, at the computing device, a plurality of sets of control words or entitlement control messages (ECMs); and
encrypting, by the configured plurality of encryption modules, a plurality of sets of content data respectively based on the plurality of sets of control words or ECMs to produce an encrypted plurality of sets of content data.

16. The method of claim 15, wherein:
receiving the plurality of sets of encryption settings is via an encryption settings interface, and
receiving the plurality of sets of controls words or ECMs is via one or more interfaces different from the encryption settings interface.

17. The method of claim 16, wherein the receiving the plurality sets of encryption settings is respectively from a plurality of encryption managers respectively configured to convert the plurality of sets of encryption settings from a plurality of different formats corresponding to the plurality of conditional access devices to a format associated with the encryption settings interface.

18. The method of claim 15, further comprising:
modulating the encrypted plurality of sets of content data with one or more signals.

19. The method of claim 15, wherein the computing device is a line card of a plurality of line cards connected to an access platform.

* * * * *